US007121929B2

(12) United States Patent
Wallace

(10) Patent No.: US 7,121,929 B2
(45) Date of Patent: Oct. 17, 2006

(54) ROLLER SHAFT FOR A VEGETABLE PEELER

(75) Inventor: Joseph E. Wallace, Creston, IA (US)

(73) Assignee: Vanmark Corporation, Creston, IA (US)

( * ) Notice: Subject to any disclaimer, the term of this patent is extended or adjusted under 35 U.S.C. 154(b) by 199 days.

(21) Appl. No.: 10/867,832

(22) Filed: Jun. 15, 2004

(65) Prior Publication Data

US 2005/0277369 A1    Dec. 15, 2005

(51) Int. Cl.
*B24B 1/00* (2006.01)
(52) U.S. Cl. .......................................... 451/56; 451/65
(58) Field of Classification Search .................. 451/56, 451/65; 99/625, 628; 426/231
See application file for complete search history.

(56) References Cited

U.S. PATENT DOCUMENTS

| RE29,030 | E | * | 11/1976 | Hirahara | ..................... 99/630 |
| 5,858,429 | A | * | 1/1999 | Wallace | ..................... 426/431 |
| 6,575,085 | B1 | * | 6/2003 | Thomas et al. | ............... 99/625 |
| 6,612,226 | B1 | * | 9/2003 | Schrader et al. | .............. 99/628 |

\* cited by examiner

*Primary Examiner*—Lee D. Wilson

(57) ABSTRACT

An improved roller shaft for a food peeling machine that allows for an improved method of changing abrasive sections that are on the shaft, the improved shaft having a first and second end with removable retaining elements and the method involving the use of a hydrostatic cylinder to place a new abrasive section on the roller shaft thus causing the most worn section to slide off the shaft.

5 Claims, 7 Drawing Sheets

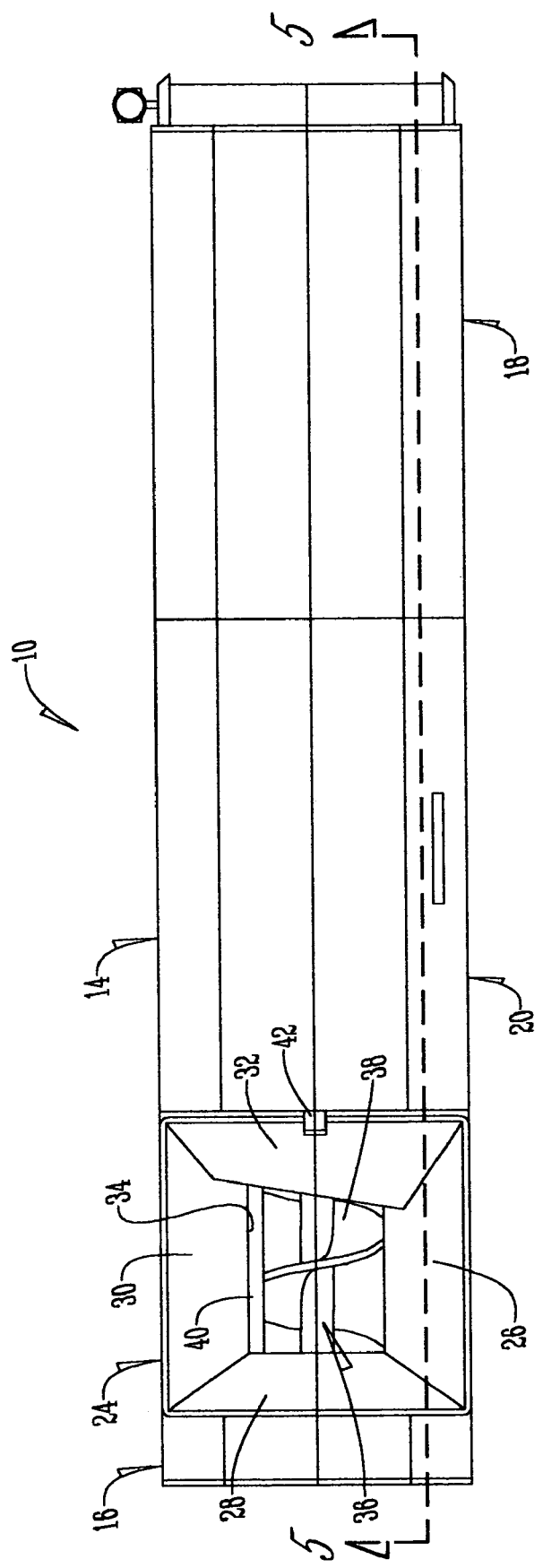

ROLLER SHAFT FOR A VEGETABLE PEELER

BACKGROUND OF THE INVENTION

The present invention relates to the shaft of a roller used in a food peeling device. More specifically and without limitation, this invention relates to a roller that can be accessed on both ends to facilitate the replacement process of an abrasive section on the roller shaft.

In the art of food peelers, a plurality of rollers are used within a peeling chamber to peel the skin off food items such as potatoes or pistachio nuts. Hundreds of potatoes are placed in a hopper having an auger that propels the potatoes into a peeling chamber. As the potatoes progress along the length of the rollers, the rollers, which have an abrasive material therein, skin the food product. Because of this method, the abrasive material used at the inlet end of the peeler wears out much faster than the abrasive material at the outlet end of the peeler. Consequently, to ensure that maximum use is garnered out of the abrasive material on the rollers, the abrasive material is split into several sections. Thus, when a section at the inlet end of the roller becomes worn, that section may be replaced by taking the roller shaft out of the peeling chamber and removing that section from the roller shaft.

Traditionally, roller shafts have been made with a single end that rotatably detaches from the shaft to allow access to the sections of abrasive material on the roller. When a section is worn and needs to be replaced, the end, as well as various sections of abrasive material need to be removed to gain access to the worn section.

The current method of changing the abrasive sections on a roller shaft requires a time consuming and labor intensive process. Because only one side of the roller end can be removed and likewise be removed from the roller shaft to gain access to the worn section, down time results. This down time can result in substantial lost profits. Consequently, there is a need in the art for an improved roller shaft that will allow for quick changing of abrasive material sections on the roller shaft. Additionally, there is a need for an improved method of replacing the abrasive material sections on a roller shaft that reduces down time during the replacement.

Therefore, it is a primary object of the present invention to provide for an improved roller shaft that allows for easy access to the abrasive material sections on the roller shaft.

Yet another object of the present invention is to provide an improved roller shaft that allows access to the abrasive material sections on both ends of the roller shaft.

Another object of the present invention is to use a hydraulic pump in order to replace the abrasive material section of a roller shaft assembly.

These and others objects, features, or advantages of the present invention will become apparent from the specification and claims.

BRIEF SUMMARY OF THE INVENTION

The present invention is an improved food peeling and processing device. The roller is mounted on the frame of the food processing device and has an elongated body with a first and second end. The first end is rotatably secured to the frame and has a retaining element to hold abrasive material sections on the elongated body. The second end additionally has a retainer block that also receives the second end in locked engagement and additionally holds the abrasive material sections in place. By having a first and second retaining element, both retaining elements may be removed and the roller may be placed adjacent a hydraulic cylinder that places a new abrasive material section onto the shaft thus causing the other abrasive material sections to slide along the shaft forcing the most worn section off the shaft. Consequently, the retaining elements can be replaced and the roller shaft can be remounted on the peeling machine.

BRIEF DESCRIPTION OF THE DRAWINGS

FIG. 1 is a top plan view of a peeling machine equipped with the present invention;

DETAILED DESCRIPTION OF THE EMBODIMENTS OF THE INVENTION

Figure 5:
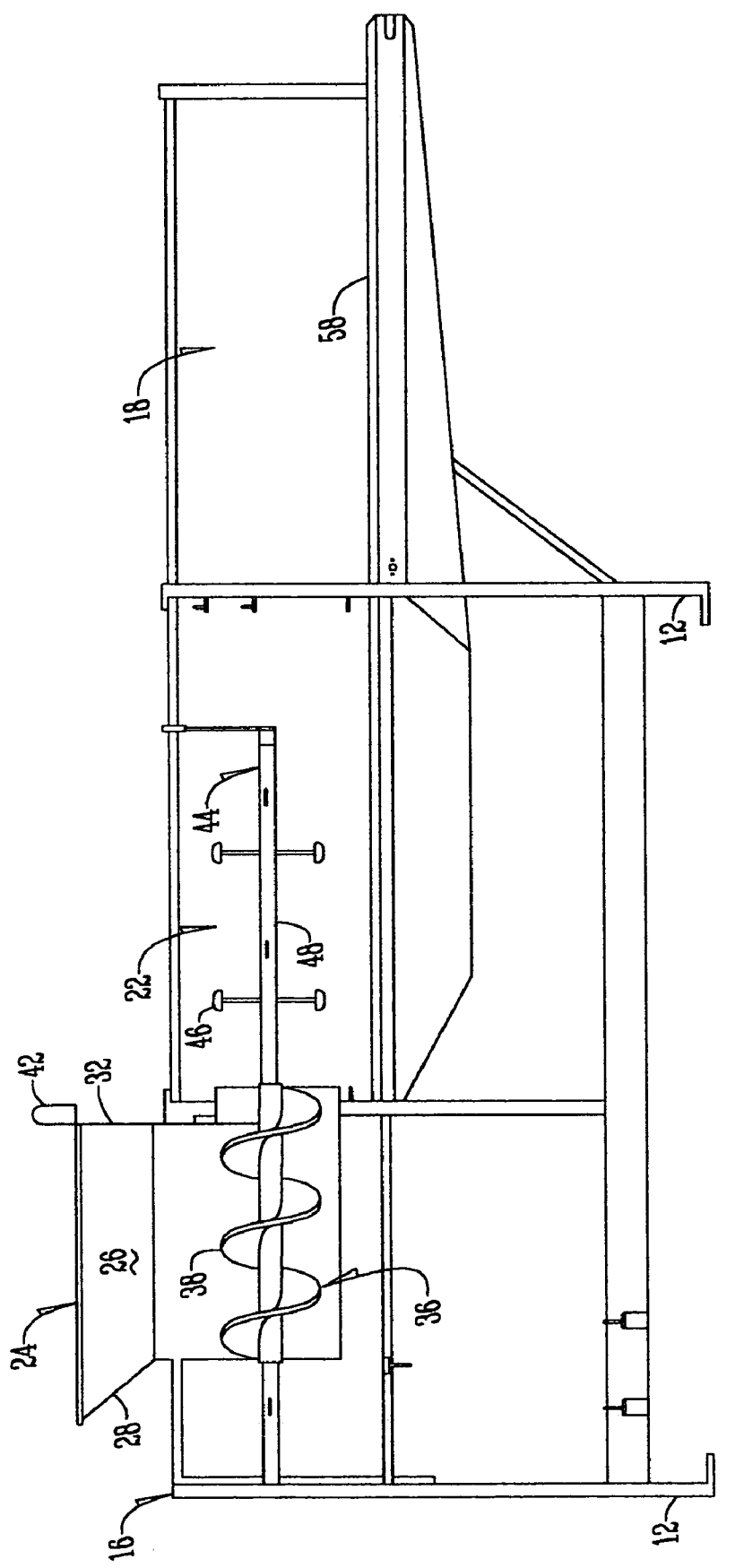
FIG. 5 is a longitudinal sectional view taken along the lines 5—5 in FIG. 1.

The peeling machine, device or means of the present invention is generally denoted by the reference numeral 10 in the drawings and this description. Referring to FIGS. 1–3 and 6, the peeling machine 10 has a plurality of supporting elements or legs 12 supporting an elongated body 14. The body 14 includes an infeed section 16, an output section 18 and a peeling section 20 between the infeed and output sections 16, 18. The peeling section 20 comprises a peeling compartment or chamber 22 substantially enclosed by a plurality of walls or frame (FIG. 5).

The infeed section has a hopper 24 with a top opening for depositing the product to be peeled. The hopper walls 26,28,30,32 are slanted inwardly and their lower edges define a bottom opening or mouth 34 disposed above an infeed auger 36. The infeed auger 36, hereinafter referred to as auger, has one or more helical auger flight(s) 38 which provide a continuous and consistent product infeed rate to the peeling chamber. The auger 36 and hopper 24 eliminate pinch points and product damage by wrapping the hopper wall 32 around the auger 36 to the ten o'clock position looking in the direction of product flow. This ten o'clock position allows product to seek a path either one side or the other of the auger flight 38. The product is not drawn into a pinch point, which would happen if the hopper wall 32 was tangentially vertical to the outer circumference of the auger. The auger rotation is counter-clockwise and creates a down movement at the point of tangency. A lip 40 is formed at an obtuse angle at the bottom portion of wall 30. Thus, the bottom opening 34 of the hopper 24 is non-parallel to the edge of the flight 38. The combination of the hopper surfaces 28–32, 40, hopper opening 34 and auger flight(s) 38, allow product to be run with no damage. The rotational speed of the auger 36 and its cubic displacement govern the product feed rate to the peeling chamber 22.

A limit switch 42 controls two levels within this hopper 24: 1) the top of the flights, and 2) the top of the hopper 24. Loading product to the first level (to the top of the flights)

ensures the auger 36 is completely filled therefore the displacement of this auger 36 will feed product into the peeling chamber 22 at an exact, continuous, and consistent rate. When the auger 36 is running the limit switch 42 will stop the peeler 10 if the product level falls below the top of the flights 38. This ensures a consistent product infeed rate to the peeling chamber 22. Secondly, this limit switch 42 also controls the upper level of the hopper 24 (capacity) and signals incoming product transporting devices to shut off when this limit is reached. The speed control of this hopper 24 is meant to be at the disposal of the operator who must adjust the throughput rate of the peeler 10 to match other equipment to provide a continuous flow through the entire line.

Figure 6:
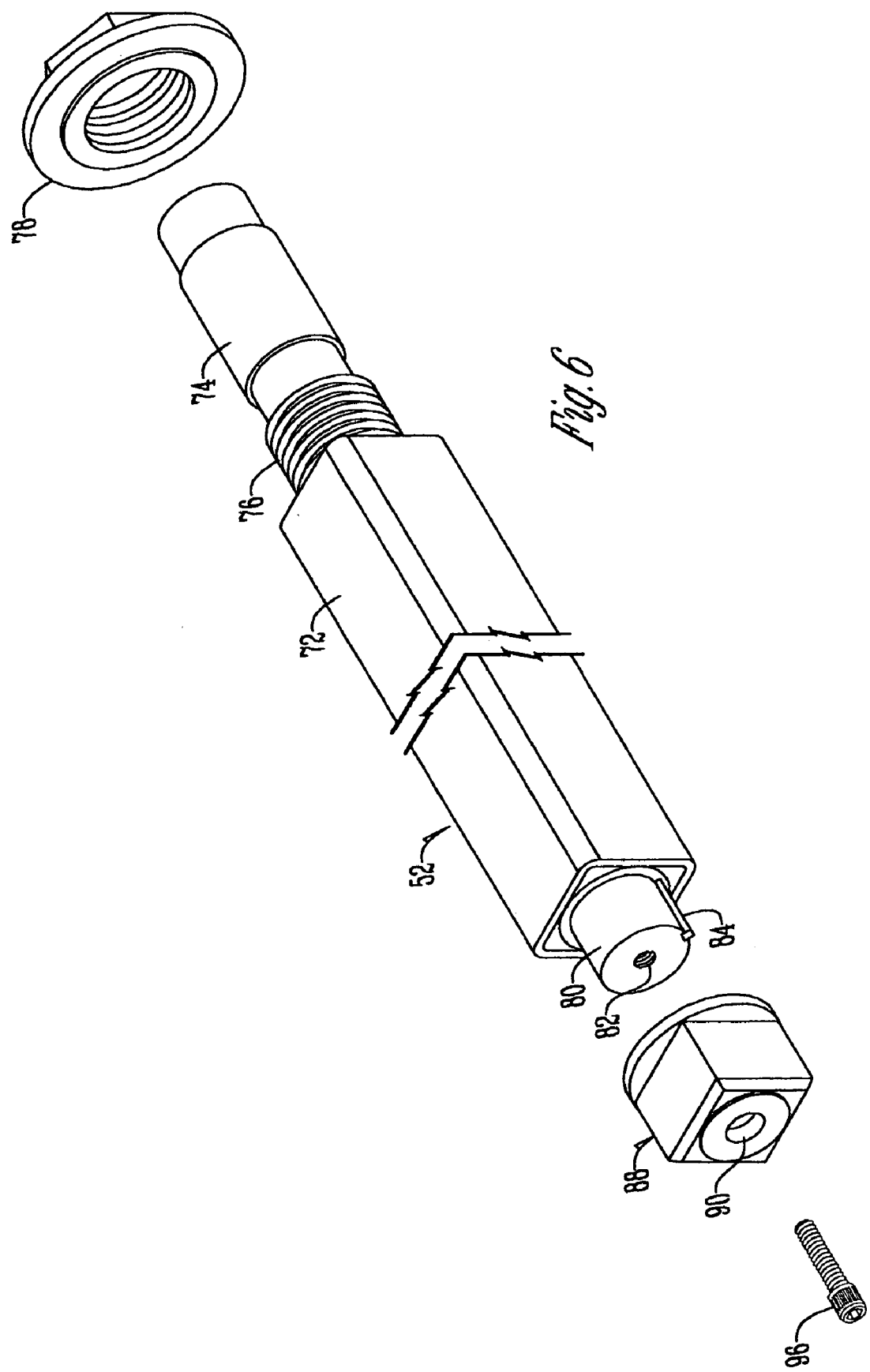
FIG. 6 is a perspective view of the roller shaft of the present invention.

Moving into the peeling chamber 22 and referring to FIG. 5, a product tumbler 44, hereinafter referred to as tumbler, is rotatably mounted therein and driven in conventional manner. The tumbler 44 has flexible paddles 46 mounted on a generally horizontal shaft 48 in the center of the peeling chamber 22. The tumbler 44 extends substantially parallel to the longitudinal axis of the elongated peeling rolls 50 (FIG. 6). This assures that regardless of the friction between peeling surface and product that the product will tumble by the action of this tumbler. The tumbler 44 rotates in the same direction as the product would naturally move in the peeling chamber 22.

The peeling rolls 50 comprise a series of shafts 52 upon which are installed rolls or sections 54a, 54b, 54c, 54d, and 54e having various types of surfaces; such as abrasive, brush, pintle, lift, etc. Rolls 50 touch the product and peel, wash or otherwise have contact with or act upon the product. The rotational speed of the rolls 50 is adjustable and clockwise in the direction of the product flow. On exceptions, multiple or individual rolls 50 may rotate in an opposite direction to adjacent rolls 50 to intentionally create a pulling motion to eliminate debris from the peeling chamber 22, i.e. for cleaning purposes. As product moves longitudinally along these rolls 50 a continuous effect between peeling rolls and product provides the required end result of peeled or washed product.

Adjustment to the speed of the peeling roll 50 is one means of creating a desired effect; a second means is adjusting the load or amount of product within the peeling chamber 22. The time product takes to travel the length of the rolls 50 is the time allowed to peel or wash to accomplish the desired end result, however this time is a factor of the total line capacity and therefore retention time is not a part of this invention theory. With this in mind, adjustments such as roll speed and load level within the peeling chamber are the controls used to create the desired peeling or washing effect.

As the peeling rolls 50 rotate they create tumbling action within the machine 10. This natural tumbling of the product, or when assisted by a tumbler 44, creates action of the product within the peeling chamber 22. This action allows the entire outer surface of the product to come in contact with the peeling or washing surface of the rolls 50. This area of contact is measured by the diameter times the length of the peeling roll 50 and gives square feet of surface area for the product to contact. Increasing the rotational speed of the rolls 50 increases the available area for the product to contact the peeling or washing surface. Inversely with the decrease of the rotational speed of the rolls 50 the surface area is decreased. This is known as the amount of peeling or washing area.

Figure 3:
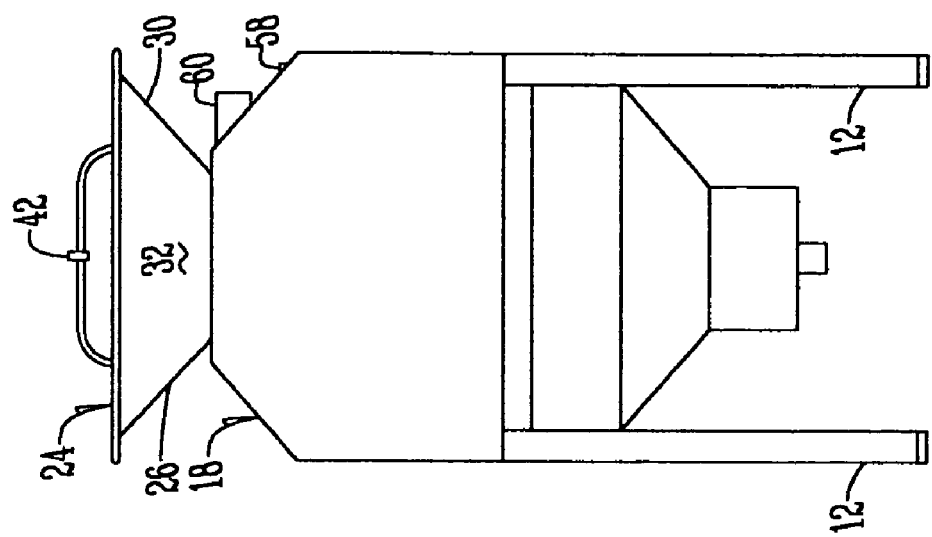
FIG. 3 is an end elevation view of the end opposite the discharge gate.
Figure 2:
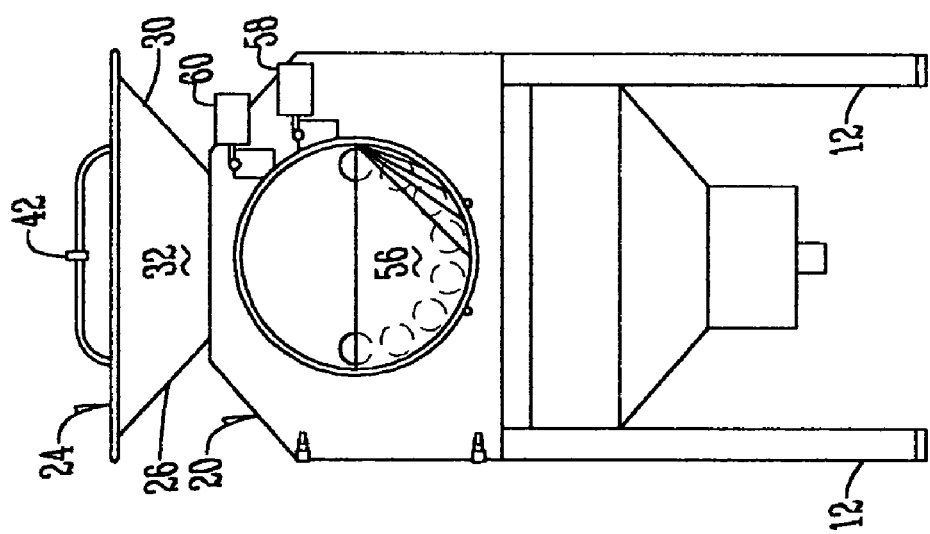
FIG. 2 is an end elevation view showing the discharge gate.
Figure 4:
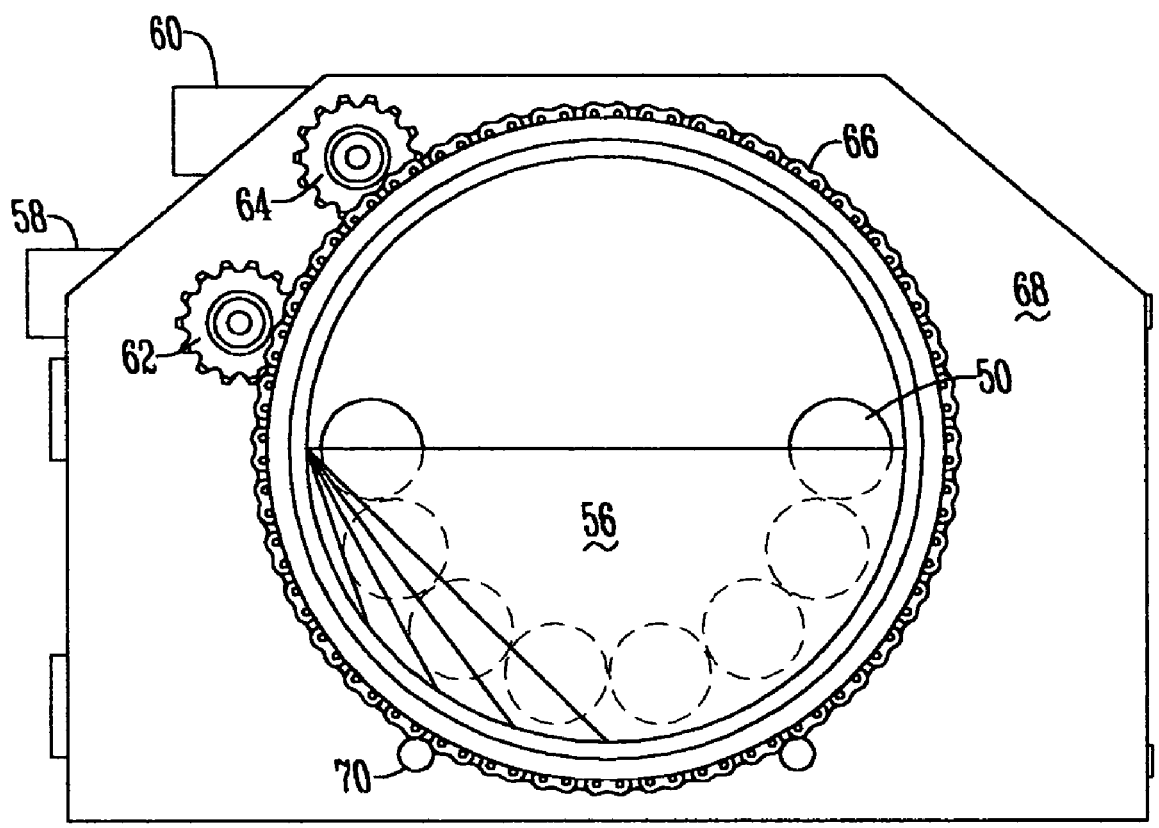
FIG. 4 is a sectional view showing the reversed or inner side of the discharge gate of FIG. 2.

Moving to the output section 18 of the peeler 10 and referring to FIG. 2 the discharge gate 56, hereinafter referred to as gate, is an adjustable load level control device. It creates an adjustable restriction of the product level within the peeling chamber 22; i.e., the higher the dam and deeper the water. As best seen in FIG. 4, a pair of motors 58, 60 respectively drive sprockets 62, 64 which engage a chain 66 fixed to the periphery of the discharge gate 51. The gate 56 is journaled in a surrounding frame 68 and guided by guide rollers 70 so as to rotate and thereby be adjustable between open and closed positions when driven by the sprockets 62, 64.

Product load within the peeling chamber 22 is varied by the position of the discharge gate 56. As the gate 56 is closed it creates a deeper load of product in the peeling chamber 22 creating more pressure between the product and the peeling surface by building product on top of product. As the gate 52 is opened it allows product to flow from the machine creating a lesser depth of load in the peeling chamber 22 thus creating less pressure between product and peeling surface. This is known as the effect of the peeling or washing surface.

Therefore, with a consistent and continuous infeed rate and a given capacity of product throughput, the two adjustments needed for the desired end product result are effect and amount of the peeling or washing surface. The gate position determines the effect and rotational speed of the rolls 50 determines the amount. These two adjustments will interact with each other at any volume of throughput within the machine's range of volume and speed. The primary control is the position of the gate 56 (effect); the secondary control is the roll speed (amount). With consistent and continuous input capacities dictated by the control of the auger 36, and balanced controls between gate position and roll speed, end product results can be predicted.

As seen in FIG. 6, the present invention is an improved roller shaft 52. The shaft 52 has an elongated mounting section 72, a first end 74 extending from the mounting surface and rotatably connected to a bearing on the encasing machine 10 for rotation. At the base of the first end 74 are threads 76 for receiving a retaining element 78. Additionally, the shaft 52 has a second end 80 that has a central threaded bore 82 and a male key member 84.

Figure 7:
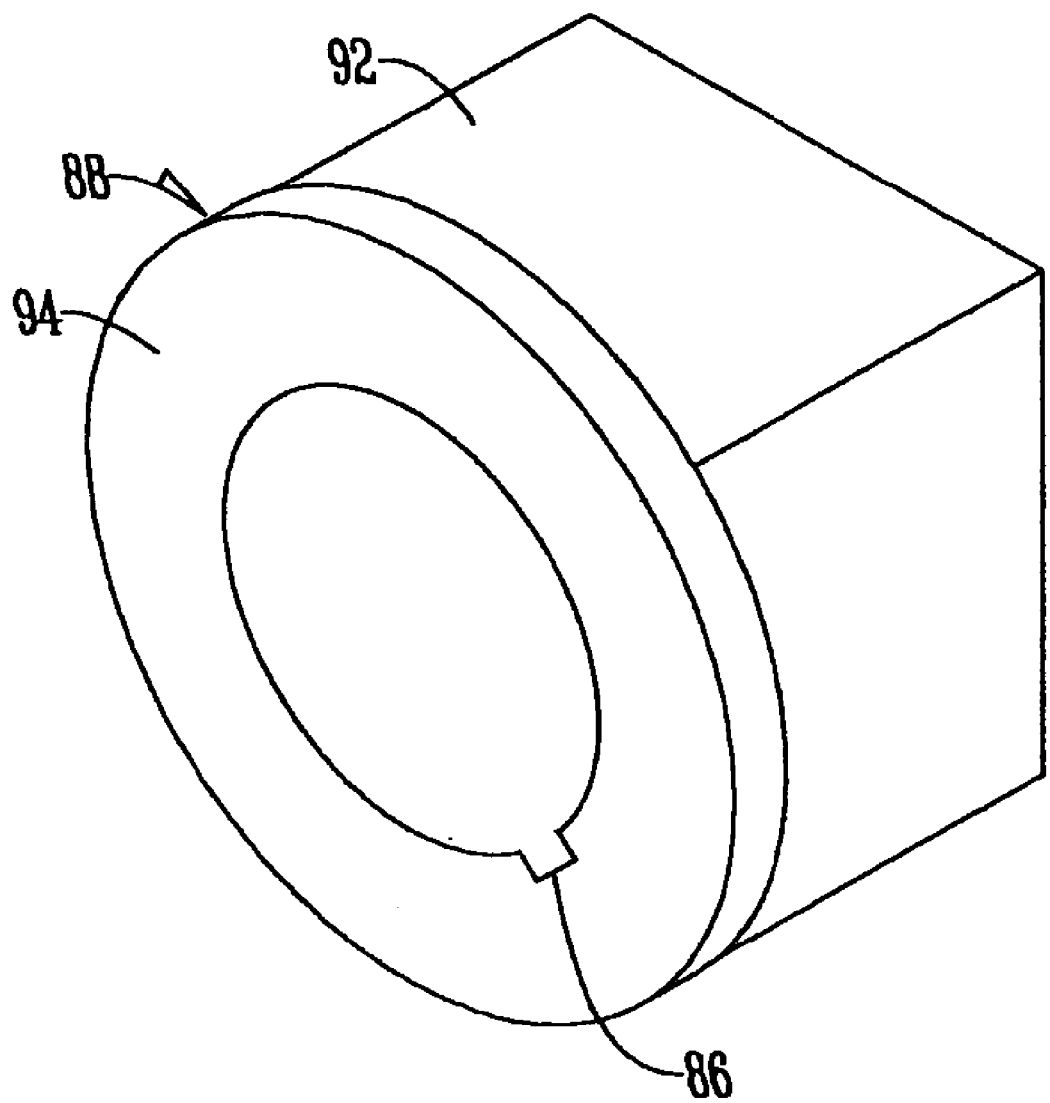
FIG. 7 is perspective view of a retainer block.

As seen in FIG. 7, the retainer block 88 has a central bore 90 that receives and surrounds the second end 80. The male key member 84 of the second end 80 is received within the female groove 86 of the retainer block 88 such that the second end 80 is in locked engagement with the retainer block 88. The retainer block 88 has a block portion 92 with a cylindrical flange base 94. A threaded bolt or cap screw 96 fits into the central bore 90 of the retainer block 88 and threadably engages the central threaded bore 82 of the second end 80, thus securing the retainer block 88 to the roller shaft 52. The retainer block 88 is rotatably secured to the frame such that the second end 80 which is received within.

Figure 8:
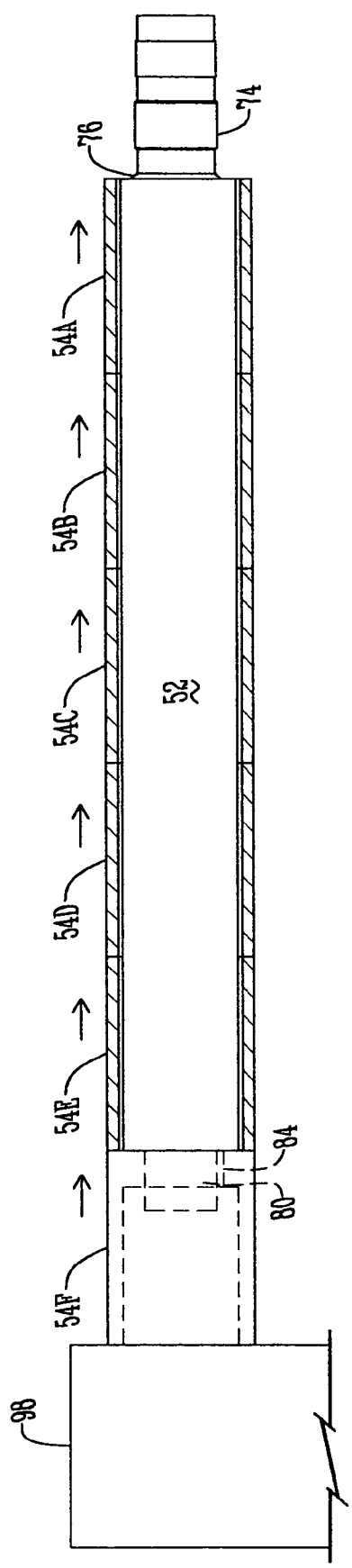
FIG. 8 is a plan view of the hydraulic cylinder block in association with the roller shaft.

As can be seen in FIG. 8, a plurality of sections 54a–e are slidably secured to the roller shaft 52 and retained by retaining element 78 and retainer block 88. Thus, the sections 54a–e may be accessed from both the first end 74 and the second end 80 so that a new section 54f may be slid on the shaft 52 thus causing sections 54b–e to slide along the shaft 52 thus pushing section 54a off of the shaft. This process may be accomplished by using a hydrostatic cylinder block to slide section 54f onto the shaft.

In operation, when a food item enters the peeling chamber 22, the peeling sections 54a–b at the inlet end of the chamber 22 undergo more wear than the sections 54c–e at the discharge end of the chamber 22 because these sections 54a–b at the inlet end of the peeling chamber 22 perform a majority of the peeling. Thus section 54*a,* which is closest to the chamber inlet, will need to be the first section that needs to be replaced. When section 54*a* needs to be replaced, after the machine 10 is turned off, an individual will remove an entire peeling roller 50 from the peeling chamber. Then, both the retaining element 78 and the retainer block 88 can be removed from the roller shaft 52. Next, a new abrasive section 54*f* is placed on the hydraulic cylinder 98 and against the second end 80 of the roller shaft 52 such that when the hydraulic cylinder 98 is actuated, the abrasive section 54*f* that is on the hydraulic cylinder 98 pushes against abrasive section 54*e* and causes the rest of the sections 54*a–d* to slide along the shaft 52 thus forcing the most worn section 54*a* off of the shaft 52. Once the abrasive section 54*a* has been replaced, the retaining element 78 and retainer block 88 can be resecured to the shaft 52 and the peeling roller 50 may be placed back into the peeling chamber 22.

By using an additional removable retainer block 88 and a hydraulic cylinder 98, the present method of changing abrasive material sections 54*a–e* from the roller shaft 52 improves upon the state of the art. This method enables an abrasive section 54*a* to be replaced without the removal of additional abrasive sections 54*b–e,* thus, valuable down time is saved. Consequently, the invention achieves all of its stated objectives.

It will be appreciated by those skilled in the art that other various modifications could be made to the device without the parting from the spirit in scope of this invention. All such modifications and changes fall within the scope of the claims and are intended to be covered thereby.

What is claimed is:

1. A roller for a food processing device having a frame, the roller comprising:
   an elongated body having a first and second end;
   at least one abrasive material section slidably connected on the elongated body;
   the first end rotatably secured to the frame; and
   the second end of the roller received within a retainer block; and
   the retainer block rotatably secured to the frame.

2. The roller of claim 1 wherein the retainer block receives the second end in locked engagement.

3. The roller of claim 2 wherein the retaining element is threadably secured to the first end.

4. The roller of claim 1 wherein the retainer block prevents movement of the abrasive material section.

5. The roller of claim 1 wherein the retainer block is retained in locked engagement using a cap screw.

\* \* \* \* \*